United States Patent

[11] 3,599,597

[72] Inventors William F. Maday
Tempe;
Joseph L. Tyrrell, Phoenix, both of, Ariz.
[21] Appl. No. 825,199
[22] Filed May 16, 1969
[45] Patented Aug. 17, 1971
[73] Assignee Sperry Rand Corporation
Great Neck, N.Y.

[54] ADJUSTABLE METER MOUNTING
6 Claims, 3 Drawing Figs.
[52] U.S. Cl. .................................................. 116/129,
33/204, 73/178, 116/136.5, 248/180, 248/274,
324/114, 324/156, 340/27, 343/107
[51] Int. Cl. ................................................. G09f 9/00
[50] Field of Search........................................... 116/114,
124, 129, 136.5, 115.5, 129 A, 129 B, 129 T;
73/178, 378.3; 248/16, 180, 274, 288; 324/143,
146, 147, 157, 152, 155, 156; 33/204, 1.5 C;
343/107; 340/27

[56] References Cited
UNITED STATES PATENTS

| 497,925 | 5/1893 | Moller | 116/136.5 UX |
|---|---|---|---|
| 901,284 | 10/1908 | Edmunds | 248/180 X |
| 1,670,897 | 5/1928 | Mercier | 324/152 |
| 1,708,894 | 4/1929 | Peter | 324/152 |
| 2,185,971 | 1/1940 | Achtel et al. | 116/129 UX |
| 2,313,444 | 3/1943 | Lamb | 324/155 |
| 2,675,732 | 4/1954 | Angst | 73/432 X |
| 3,015,951 | 1/1962 | Ochs, Jr. | 116/129 UX |
| 3,292,176 | 12/1966 | Crane | 73/178 X |

Primary Examiner—Louis J. Capozi
Attorney—S. C. Yeaton

ABSTRACT: Apparatus for aligning a meter pointer relative to a housing in which the meter is installed. Three set screws arranged in a triangular pattern and threaded through a support structure rigidly affixed to the housing are adjustable to orient the meter relative to the support structure so that the pointer can move along a prescribed path free from contact with other components incorporated in the housing.

INVENTORS
WILLIAM F. MADAY
JOSEPH L. TYRRELL
BY

*H.P. Terry*
ATTORNEY

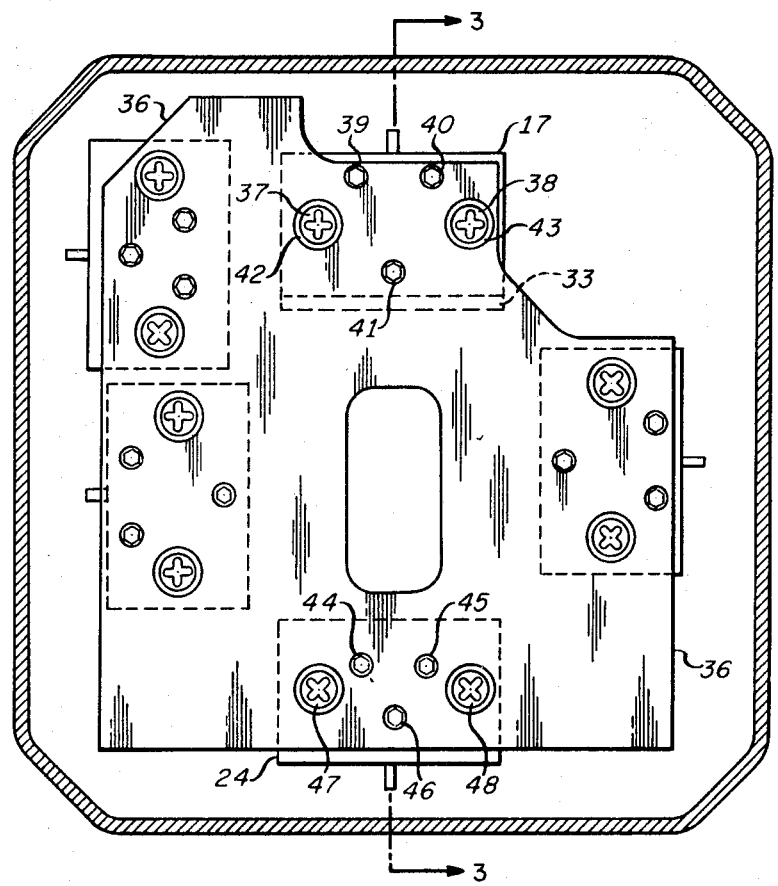
FIG. 2.
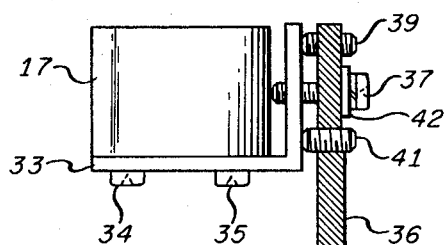
FIG. 3.
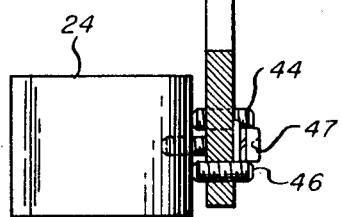

ADJUSTABLE METER MOUNTING

BACKGROUND OF THE INVENTION

1. Field of the Invention

The present invention relates to alignment apparatus and more particularly to means for orienting a pointer or indexing member to preclude contact thereof with other components as it moves along a prescribed path. It is especially useful for aligning indexing members such as comparatively long meter pointers which are required to move along a path having extremely tight clearance tolerances.

2. Description of the Prior Art

Flight director indicator instruments used in avionics systems where space is at a premium are a salient example of devices in which meter-driven pointers are required to move along precisely confined paths. Such instruments typically include a plurality of meters, perhaps as many as five or more, enclosed in a common housing, each having an associated comparatively long pointer moving relative to either individual or common scales positioned in a small observable region of the indicator. Heretofore, to avoid contact of the various pointers with one another or other components of the indicator, it has been necessary to mount the meters on carefully machined surfaces in the instrument housing. In addition, the shape and dimensions of the pointers have had to be closely controlled during manufacture. Even with these restrictions, however, it has frequently been necessary to bend the meter pointer in order to obtain adequate clearance from other components. Bending the pointer though presented the additional problem of having to remove the pointer and heat treat it to relieve stresses therein.

SUMMARY OF THE INVENTION

The present invention provides simple means for aligning a meter pointer so that it has adequate clearance from other components thereby simplifying both the manufacture and assembly of an indicator mechanism as well as eliminating the necessity for bending and heat-treating the pointer. In a preferred embodiment of the invention used in a flight director indicator, each meter is disposed relative to three set screws arranged in a triangular pattern and threaded through a meter support structure into contact with the meter. To orient the pointer, the meter is temporarily loosened from its rigid connection to the support structure. This enables the set screws to be adjusted so as to move the meter pointer relative to the indicator housing. After the pointer has been appropriately positioned so that it can move along a prescribed path without contacting other components, the meter is again rigidly clamped to the support structure in readiness for normal operation. Additional set screws adjusted in relation to other meters permit the individual pointers thereof to be separately aligned in a similar manner.

BRIEF DESCRIPTION OF THE DRAWINGS

FIG. 2 is a rear view of the flight director indicator shown in FIG. 1; and

FIG. 3 is a sectional view taken through FIG. 2.

DESCRIPTION OF THE PREFERRED EMBODIMENT

Figure 1:
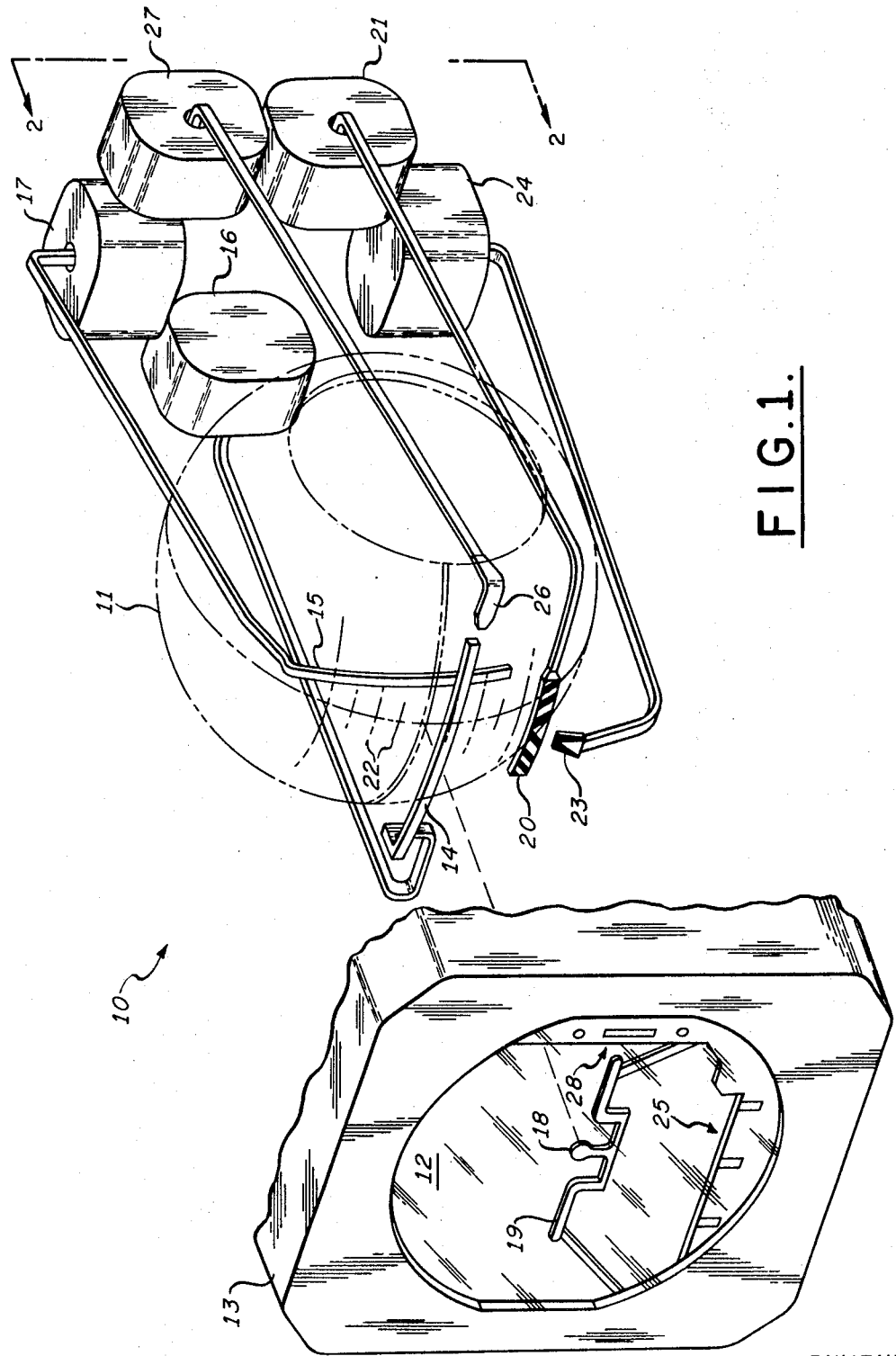
FIG. 1 is an exploded pictorial view of a flight director indicator embodying the meter pointer adjustment mechanism of the present invention.

Referring to FIG. 1, a flight director indicator 10 comprising an artificial horizon sphere 11 for indicating aircraft pitch and roll attitude is controlled in a conventional manner by pitch and roll signals derived from a remote vertical gyro. The horizon sphere is observed through a face 12 in bezel 13 along with various meter-driven pointers such as pitch and roll cross-pointers 14 and 15 which connect respectively to actuator mechanisms in meters 16 and 17 and move in response to pilot pitch and roll command for maneuvering the craft. The cross-pointers normally intersect on the ball 18 of miniature airplane cursor 19 when the aircraft is flying on or achieving a selected flight path with respect to reference signals fed into a flight director computer (not shown). Intersection of the cross-pointers at some other point indicates that the aircraft is displaced from a selected flight path and that pitch and roll control must be applied by the pilot to correct for flight path error. Other pointers may typically include an absolute altitude pointer 20 actuated by meter 21 to move relative to the vertically disposed graduations 22 on the horizon sphere, a localizer deviation pointer 23 actuated by meter 24 to move relative to a localizer deviation scale 25, and a glide slope deviation pointer 26 actuated by meter 27 to move relative to a glide slope scale 28.

The various pointers are viewed through face 12 so that flight path information of interest to the pilot is observed with reference to the pitch and roll attitude of the aircraft as indicated by the horizon sphere. In a typical flight director indicator, aircraft roll attitude is also displayed by a bank angle pointer coupled to the roll axis of the horizon sphere to move relative to reference markers on a mask (not shown) which is positioned such that the free ends of the pointers are located between it and bezel 13. In addition to the pointers and the miniature airplane cursor, various warning flags for indicating malfunction of other units such as the flight director computer and vertical gyro are normally held out of view behind the bezel and move into view between the bezel and mask upon the occurrence of a malfunction.

It is thus seen that many parts are required to move in a rather confined volume, particularly in view of the desire to conserve as much space as possible in instruments that are to be mounted in the pilot compartment of an aircraft. Consequently, as hereinbefore mentioned, there is considerable probability that one or more of these moving components will interfere with either one another or some stationary part of the flight director indicator unless precision manufacturing methods and careful assembly procedures are employed. In the interest of not only eliminating the necessity for critical construction tolerances but also preventing damage to the pointers the present invention provides means for independently adjusting the position of any one or more of the pointers. Referring to FIGS. 2 and 3, roll cross-pointer 15, for example, is capable of being adjusted by virtue of meter 17 being affixed to an L-shaped bracket 33 by mounting screws 34 and 35. Bracket 33 in turn is adjustably secured to a rigid instrument partition or support structure 36 so that it may be adjusted in three degrees of freedom by means of clamping screws 37 and 38 and set screws 39, 40 and 41 threaded through the instrument partition. Clamping screws 37 and 38 include spring-type lock washers 42 and 43 respectively. In operation, the L-shaped bracket and hence meter 17 with its long pointer 15 may be adjusted by backing off clamping screws 37 and 38 to a sufficient extent that the spring washers maintain a load between the screw head and instrument partition 36, and thereafter adjusting set screws 39, 40 and 41 until the desired pointer position is achieved. Clamping screws 37 and 38 are then tightened to maintain the meter movement in its adjusted position.

Various modifications are of course possible for the meter mounting set up. For instance, pointer 23 connected to meter 24 directly secured to instrument partition 36 is adjustably positioned in the foregoing manner by means of setscrews 44, 45, and 46 operating in combination with clamping screws 47 and 48. Irrespective of the mounting configuration that is used, however, movement of any one of the setscrews in its threads in the instrument partition causes the free end of the meter pointer to move about an axis passing through the other two setscrews. Thus, appropriate adjustment of each set screw enables the free end of the pointer to be moved to any desired position in a given spherical section determined in accordance with the range of motion of the setscrews and the length of the pointer.

While the invention has been described in its preferred embodiment, it is to be understood that the words which have been used are words of description rather than limitation and that changes may be made without departing from the true scope and spirit of the invention in its broader aspects.

We claim:

1. Apparatus for orienting an indexing means relative to a reference member comprising
   an actuator mechanism to which the indexing means is affixed, said actuating mechanism being normally operative to drive the indexing means relative to the reference member,
   a support structure,
   means for mounting the actuator mechanism on the support structure, and
   means including a plurality of set screws threaded through the support structure for adjusting the location of the actuator mechanism relative to the support structure in a loosened condition of said mounting means such that a point on the indexing means can be positioned at any location in a given spherical section and thereafter maintained at said location in a tightened condition of said mounting means.

2. The apparatus of claim 1 wherein said plurality of setscrews consists of three setscrews arranged in a triangular pattern and threaded through the support structure such that motion of any setscrew relative to the mounting means produces rotation of the actuator mechanism about an axis passing through the other two setscrews.

3. The apparatus of claim 2 wherein the mounting means includes a bracket connected to the support structure and the actuator mechanism is secured to the bracket.

4. A flight director indicator comprising
   a plurality of meter movements each operating to drive a respective indicator pivotally connected thereto, said indicators being arranged to move in a predetermined space observable through a viewing face in said flight director indicator,
   a support structure rigidly affixed to the housing of said flight director indicator,
   means for mounting the meter movements to said support structure, and
   means for independently adjusting the position of at least one of the meter movements relative to the support structure such that the free end of the corresponding indicator can be moved to any desired location in a given spherical secton.

5. The apparatus of claim 4 wherein the independent adjusting means includes a plurality of setscrews threaded through the support structure into contact with the mounting means, said plurality of setscrews being so disposed that movement of any one of the setscrews produces motion of the free end of the indicator along an arcuate path in said spherical section.

6. The apparatus of claim 4 wherein the plurality of setscrews comprises three screws arranged in a triangular pattern in the support structure and further including a plurality of additional adjusting means each comprising three setscrews arranged in triangular patterns and threaded through the support structure into contact with the respective mounting means for independently adjusting the position of each indicator.